(12) United States Patent
Julian et al.

(10) Patent No.: US 10,111,803 B2
(45) Date of Patent: Oct. 30, 2018

(54) MOBILITY WALKER

(71) Applicants: Vicki L. Julian, Lawrence, KS (US); Christopher Steven Julian, Lawrence, KS (US)

(72) Inventors: Vicki L. Julian, Lawrence, KS (US); Christopher Steven Julian, Lawrence, KS (US)

(*) Notice: Subject to any disclaimer, the term of this patent is extended or adjusted under 35 U.S.C. 154(b) by 0 days.

(21) Appl. No.: 15/648,048

(22) Filed: Jul. 12, 2017

(65) Prior Publication Data
US 2018/0014993 A1    Jan. 18, 2018

Related U.S. Application Data

(60) Provisional application No. 62/361,310, filed on Jul. 12, 2016.

(51) Int. Cl.
A61H 3/04     (2006.01)
B62B 3/02     (2006.01)
B62B 5/04     (2006.01)
A61H 3/06     (2006.01)

(52) U.S. Cl.
CPC ............... A61H 3/04 (2013.01); B62B 3/02 (2013.01); B62B 5/0438 (2013.01); A61H 3/06 (2013.01); A61H 2003/046 (2013.01)

(58) Field of Classification Search
CPC .......................... A61H 3/04; A61H 2003/046
See application file for complete search history.

(56) References Cited

U.S. PATENT DOCUMENTS

| 2,792,874 | A | * | 5/1957 | Sundberg | A61H 3/04 135/67 |
| 5,046,748 | A |   | 9/1991 | Oat-Judge | |
| D365,785  | S |   | 1/1996 | Sawyer | |
| 5,603,517 | A | * | 2/1997 | Lorman | A61H 3/04 135/67 |
| 5,647,602 | A | * | 7/1997 | Nevin | A61H 3/04 135/67 |
| 5,810,697 | A |   | 9/1998 | Joiner | |

(Continued)

FOREIGN PATENT DOCUMENTS

| FR | 2784022 A1 | * | 4/2000 | ............... A61H 3/04 |
| FR | 2784292 A1 | * | 4/2000 | ............... A61G 5/00 |
| WO | WO-2016137322 A1 | * | 9/2016 | ........... B62B 5/0476 |

OTHER PUBLICATIONS

Trust Care by Trustcare AB Malmo Sweden, http://www.trustcare.se/p11,en,indoor-rollators-letrsquos-go-silver.html, Accessed: Jun. 16, 2016.

(Continued)

Primary Examiner — Daniel J Troy
Assistant Examiner — Danielle Jackson
(74) Attorney, Agent, or Firm — Hovey Williams LLP

(57) ABSTRACT

A mobility walker comprising a pair of rear legs and a pair of front legs, each configured to support the mobility walker on the ground. The mobility walker further comprises a transverse handle extending laterally across a width of the mobility walker. The transverse handle is configured to be grasped by a user when operating the mobility walker. At least sixty percent of the length of each of the front legs is formed with a concave curvature, as viewed from a front of the mobility walker.

21 Claims, 8 Drawing Sheets

(56) References Cited

U.S. PATENT DOCUMENTS

| | | | |
|---|---|---|---|
| 6,367,823 B1 * | 4/2002 | Miyagi | A61H 3/04 280/47.11 |
| D465,632 S | 11/2002 | Koppes et al. | |
| D470,084 S | 2/2003 | Schlough et al. | |
| D478,198 S | 8/2003 | Koppes et al. | |
| D497,844 S | 11/2004 | Chou | |
| D501,159 S | 1/2005 | Chen | |
| D510,060 S | 9/2005 | Starck | |
| 7,229,092 B1 * | 6/2007 | Parker | A61H 3/04 280/47.11 |
| D587,634 S | 3/2009 | Myers | |
| D688,602 S | 8/2013 | Clifton | |
| D693,742 S | 11/2013 | Fredendall et al. | |
| 9,642,767 B1 * | 5/2017 | Kavanagh | A61H 3/00 |
| D792,289 S | 7/2017 | Tang | |
| 2002/0070533 A1 * | 6/2002 | Owens | A61H 3/04 280/650 |
| 2006/0254631 A1 * | 11/2006 | Mullholand | A61H 3/008 135/67 |
| 2007/0163633 A1 * | 7/2007 | Gale | A61H 3/04 135/67 |
| 2008/0191437 A1 * | 8/2008 | Staub | B05B 7/1404 280/47.34 |
| 2010/0313924 A1 * | 12/2010 | Cho | A45B 1/02 135/66 |
| 2012/0042918 A1 * | 2/2012 | Tessier | A45B 1/00 135/66 |
| 2013/0168931 A1 | 7/2013 | Baraitaru | |
| 2014/0261592 A1 * | 9/2014 | Westerlund | A61H 3/02 135/68 |

OTHER PUBLICATIONS

Features of the Carex Mobilator A334-00 online video by Carex Health Brands published Sep. 6, 2012, https://www.youtube.com/watch?v=LI2p8Tr0ct0, Accessed: Jun. 16, 2016.

* cited by examiner

MOBILITY WALKER

CROSS-REFERENCE TO RELATED APPLICATION

The present non-provisional patent application claims priority with respect to all common subject matter of previously-filed U.S. Provisional Patent Application Ser. No. 62/361,310, entitled "MOBILITY WALKER," filed on Jul. 12, 2016. The entirety of the above-identified provisional patent application is hereby incorporated by reference into the present non-provisional patent application.

BACKGROUND OF THE INVENTION

1. Field of the Invention

Embodiments of the present invention broadly relate to a mobility walker. In more detail, embodiments of the present invention are directed to a mobility walker configured to provide standing or walking support to a user.

2. Description of the Related Art

Many individuals suffer from lack of mobility due to medical conditions or advanced age. Such individuals generally require some type of mobility assistance. There currently exist numerous types of devices that assist individuals in supporting themselves while standing or walking. Such devices are generally referred to as "walkers." However, many previously-used walkers are difficult to maintain in stable configurations. Additionally, many previously-used walkers do not promote good posture for their users and do not allow for their users to walk with a normal gait.

In more detail, previously-used walkers have generally been designed with handles positioned at both sides of the walkers (hereinafter "hands at the side" design). As such, when a user operates such a walker, the user's hands are required to be positioned at the user's side such that the user can grasp each of the handles. Such a walker design can be problematic because the user must press down firmly and evenly on both handles to stabilize the walker. Stabilizing such walkers can be particularly difficult when attempting to advance the walker (e.g., walking with support from the walker). Additionally, a hands at the side walker design necessitates arms-forward movement when the user is advancing the walker. Specifically, when a user is walking with such a walker, the user's hands are required to repeatedly extend forward (from the user's sides) so as to advance the walker. However, such arms forward movement is difficult to accomplish when the user's hands are required to be positioned at his/her side. Furthermore, extending the user's arms forward makes it difficult for user to remain erect, as the user must bend or lean forward. As is generally known, bending or leaning conflicts with a correct, erect human posture, which can be problematic, particularly for individuals with medical conditions or of advanced age.

In addition to the issues noted above, previously-used walkers with hands at the side designs can also be problematic in that users tend to move a first particular foot (e.g., the user's right foot) forward as the walker is advanced. Thereafter, the user brings the second foot (e.g., the user's left foot) forward to meet the first foot. Subsequently, the user advances by again moving the first particular foot (e.g., the user's right foot) forward. Such repetitive advancement of the user's feet makes for an inconsistent gait. In addition, many types of previously-used walkers incorporate components that tend to interfere with the user's legs or feet when walking. For example, many types of previously-used walkers incorporate seat structures within the main frame of the walkers. Such components can interfere with a user's feet and legs during use, such that the user cannot walk with an appropriate, erect posture and/or with a normal gait. Also, users are generally required to walk within the confines of the walker. However, previously-used walkers often have limited space for the users' feet, such that the users are often forced to walk using baby steps, as opposed to walking with a normal gait and stride.

As such, there is a need for an improved mobility walker that provides stability to a user while the user stands and walks, and that facilitates the ability of the user to maintain a correct, erect posture and to implement a normal gait during use.

SUMMARY OF THE INVENTION

Some embodiments of the present invention include a mobility walker comprising a pair of rear legs and a pair of front legs, each configured to support the mobility walker on the ground. The mobility walker further comprises a transverse handle extending laterally across a width of the mobility walker. The transverse handle is configured to be grasped by a user when operating the mobility walker. At least sixty percent of a length of each of the front legs is formed with a concave curvature, as viewed from a front of the mobility walker.

Other embodiments of the present invention include a mobility walker comprising a pair of rear legs and a pair of front legs, each configured to support the mobility walker on the ground. The mobility walker further comprises a transverse handle extending laterally across a width of the mobility walker. The transverse handle is configured to be grasped by a user when operating the mobility walker. At least a portion of the front legs is formed with a concave curvature, as viewed from a front of the mobility walker. A center of gravity of the mobility walker is positioned forward of the transverse handle.

Some additional embodiments of the present invention include a method of operating a mobility walker by a user. The method includes the initial step of providing the mobility walker comprising a frame that includes a pair of front wheels, a pair of rear wheels, and a transverse handle. The transverse handle extends generally across a width of the mobility walker, and at least a portion of each of the front legs is formed with a concave curvature, as viewed from a front of said mobility walker. The method additionally comprises the step of grasping the transverse handle with the user's hands extended in front of the user's body. The method further comprises the step of advancing the mobility walker in a forward direction by walking forward with the user's hands grasping the transverse handle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE FIGURES

Embodiments of the present invention are described in detail below with reference to the attached drawing figures, wherein.

Figure 1:
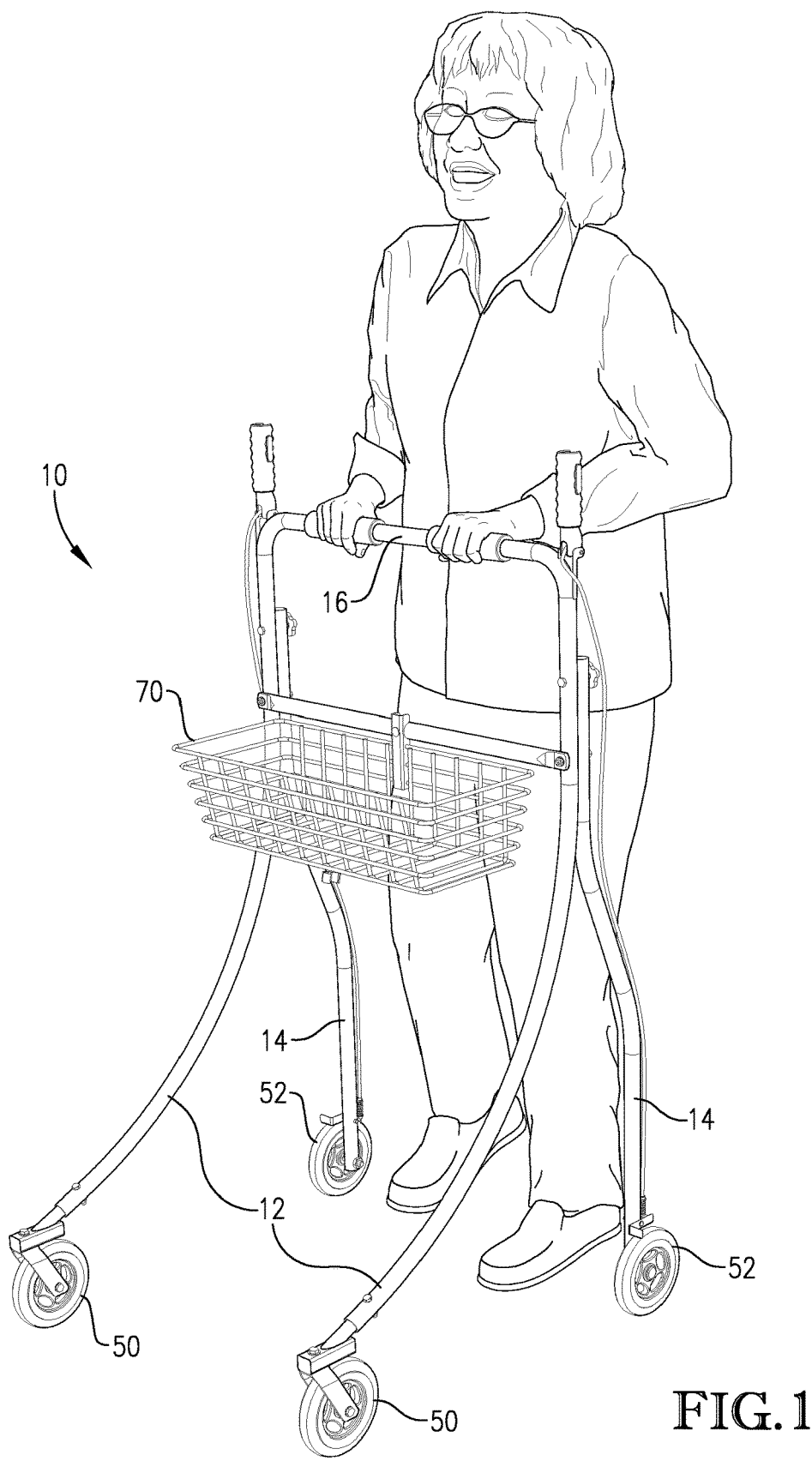
FIG. 1 is a front left perspective view of a mobility walker according to embodiments of the present invention, illustrating a user operating the mobility walker.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

With reference to the drawings, and particular FIGS. 1-5, embodiments of the present invention are directed to a mobility walker 10 that broadly comprises a frame that includes a pair of front legs 12, a pair of rear legs 14, and a transverse handle 16. In some embodiments, each of the front legs 12 may extend rearward and upward from its front end in a concave manner (when viewed from a front of the mobility walker 10). The front legs 12 may extend upward to the transverse handle 16, which connects top ends of the front legs together and which extends generally horizontally across a top of the mobility walker 10. As such, the transverse handle 16 may extend generally about an entire width of the mobility walker 10. In some embodiments the transverse handle 16 may be integrally formed with the front legs 12, such that the front legs 12 and the transverse handle 16 may be formed as a continuous section of material. Turning to the rear legs 14, each of the rear legs 14 may extend forward and upward from its rear end until it meets with, and is connected to, a corresponding front leg 12.

In view of the description provided above, the mobility walker 10 of the present invention may provide for improved stability and support over previously-used walkers. For example, the concave curvature of the front legs 12 may permit the mobility walker 10 to extend forward a significant amount, so as to provide a substantial wheelbase for the mobility walker 10. Such a substantial wheelbase can provide increased stability over many previously-used walkers. In addition, due to the forward extension of the front legs 12, a center of gravity of the mobility walker 10 (as described in more detail below) may be positioned forward of the transverse handle 16. As such, a force can be applied to the transverse handle 16 from the rear of the mobility walker 10 without fear of the mobility walker 10 becoming unstable or tipping. Specifically, as a force is supplied to the transverse handle 16, such a force can be efficiently distributed through the concave shape of the front legs 12 and into the ground surface below the front legs 12. Such stability may be particularly helpful when navigating the mobility walker 10 over height changes, such as small steps leading from a porch area to a sidewalk or driveway.

Embodiments of the mobility walker 10 will now be described in more detail. During the following description, the terms "front" or "forward" are used to mean a direction towards the front legs 12, while the terms "back," "rear," "rearward" are used to mean a direction towards the rear legs 14. As shown in FIG. 1, the exemplary user of the mobility walker is positioned at a rear of the mobility walker 10, such that the user can be at least partially supported by the mobility walker 10 as the user advances the mobility walker 10 forward. In addition, the terms "up," "upward," or "top" are used to mean a direction towards the transverse handle 16, while the terms "down," "downward," or "bottom" are used to mean a direction towards the ground or floor surface on which the mobility walker 10 is supported.

The mobility walker 10 may be formed in various heights, as may be required for particular users of varying heights. However, in other embodiments, it may be preferable for the mobility walker 10 to be formed with a standard height that allows users standing at various heights to reach the transverse handle 16 with their hands extended forward in front of their bodies so as to support themselves via the mobility walker 10. In some embodiments, for example, the mobility walker 10 may have a height of between 35 and 55 inches, between 40 and 50 inches, or about 42 inches. Nevertheless, in other embodiments, the height of the mobility walker 10 may be adjustable so as to customize the mobility walker's 10 height to a particular user's needs. For example, in some embodiments, each of the front and rear legs 12, 14 of the mobility walker 10 may be formed from at least two, telescoping leg components that allow the legs 12, 14 to be extended to various levels. In such embodiments, the legs 12, 14 may include securement mechanisms that facilitate the ability of the legs 12, 14 to be securely held at a given extension level. For instance, the securement mechanisms may include a spring-biased lock button formed on a first leg component, and a plurality of openings formed on a second leg component. In such embodiments, the button can be configured to extend through a given opening when the button and the given opening are aligned. To adjust the height of the mobility walker 10, a user may depress the button out of engagement with a given opening, and the leg components can be telescopically extended or retracted until the leg 12, 14 is at the appropriate extension level. Once at the appropriate extension level, the button can be extended through an adjacent opening to secure the leg 12, 14 components in place.

In addition, the mobility walker 10 may be formed to include a width that is sufficient to provide lateral support and stability for a user and to allow the user's legs to extend unencumbered between the legs 12, 14 of the mobility walker 10 when operating the mobility walker 10. However, the width of the mobility walker 10 should also, in some embodiments, be small enough to permit the mobility walker 10 fit through standard doorways, hallways, or the like. For instance, in some embodiments, the mobility walker 10 may have a width of between 15 and 35 inches, between 20 and 30 inches, or about 22 inches. In some additional embodiments, however, the width of the mobility walker 10 may be adjustable. For example, in some embodiments (not illustrated in the drawings) the mobility walker's 10 rear legs 14 may be hingedly connected to the front legs 12, such that the rear legs 14 can rotate inward and outward to various positions. In some embodiments, the rear legs 14 may rotate to three primary positions, including a standard position, an extended wing position, and a contracted position. In the standard position, the rear legs 14 may generally be aligned with the front legs 12 (e.g., the distance between the rear legs 14, or the width of the mobility walker 10, may be about 22 inches). In the wing position, the rear legs 14 may be rotated outwardly so as to increase the width of the mobility walker 10 and, thus, to increase the stability of the mobility walker 10 (e.g., the distance between the rear legs 14 may be about 30 inches). In some embodiments, the rear legs 14 may be rotated outwardly between 35 and 55 degrees, between 40 and 50 degrees, or about 45 degrees. In the contracted position, the rear legs 14 may be rotated inwardly between 30 and 90 degrees so as to reduce the distance between the rear legs 14 (e.g., the distance between the rear legs 14 may be about 15 inches). To facilitate the rotation of the rear legs 14, in some embodiments, the rear legs 14 may be rotatingly secured to the front legs 12 via securement mechanisms that facilitate rotation of the rear legs 14. Such securement mechanisms may also be configured to securely hold the rear legs 14 at the positions described above. In some embodiments, the securement mechanisms may comprise a spring-biased button and a plurality of openings, similar to the securement mechanisms previously described above with respect to the telescoping legs. However, the openings may be positioned circumferentially about pivot tubes that are welded to back sides of the front legs 12. A rear leg 14 may be positioned in within each of the pivot tubes such that the rear legs 14 can pivot within the pivot tubes. The spring-biased button may be integrated with each of the rear legs 14, so as to allow the buttons on the rear legs 14 to be engaged with openings formed on the pivot tubes as the rear legs 14 rotate between positions.

In some embodiments, the mobility walker 10 may have a length (i.e., a wheelbase extending between bottom ends of aligned front and rear legs 12, 14) sufficient to provide enhanced stability of the mobile walker 10. For example, in some embodiments, the mobility walker 10 may have a length of between 20 and 40 inches, between 22 and 30 inches, or about 24 inches. The extended length of the mobility walker 10 is made possible due, in part, to the concave curvature of the front legs 12. Specifically, the concave curvature of the front legs 12 allows the front legs 12 to extend in a forward/rearward direction a significant amount. Such an extension by the front legs 12 permits the mobility walker 10 to be formed with an extended wheelbase, which provides an inherent stability. In addition, the concave shape of the front legs 12 functions to efficiently distribute forces from the transverse handle 16 through the front legs 12 and into the ground or floor surface.

Figure 6:
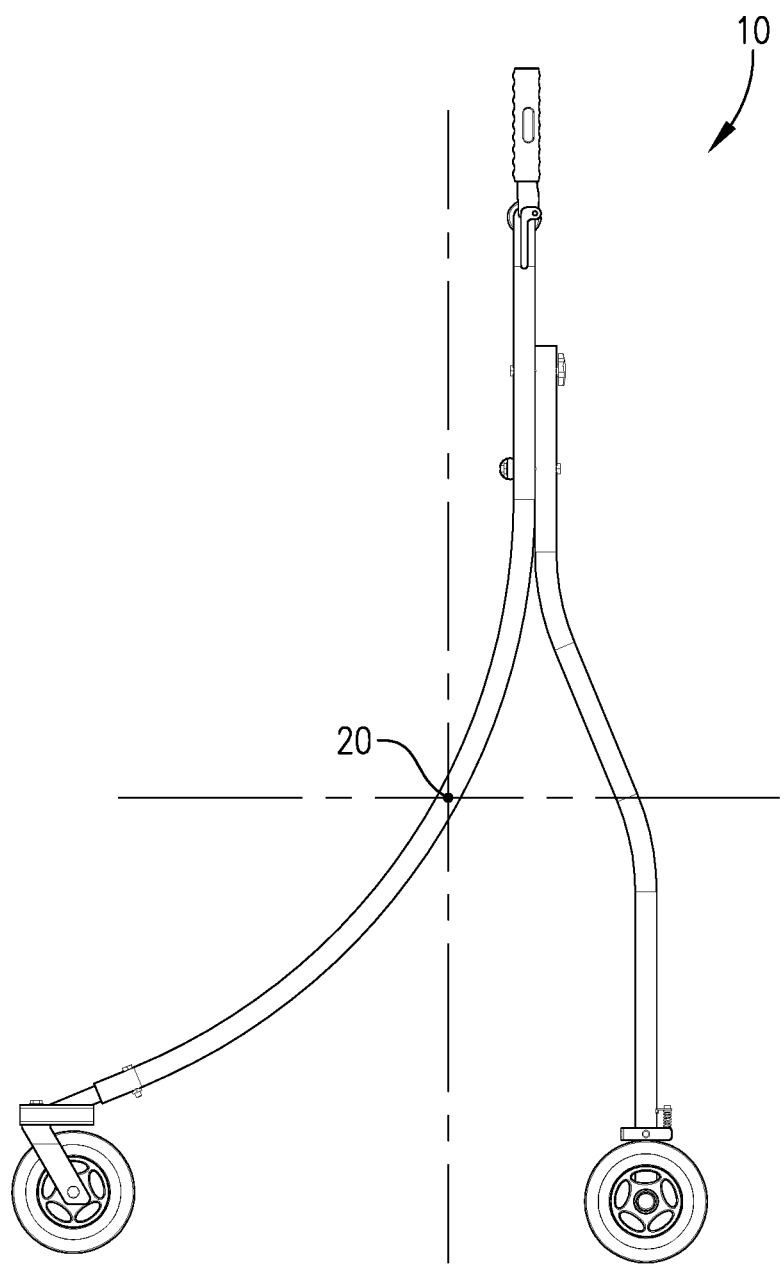
FIG. 6 is a side elevation view of the mobility walker form FIGS. 1-5.

Furthermore, the curvature and extension of the front legs 12 permits the transverse handle 16 (which may be connected to or integrally formed with the front legs 12) to be positioned rearward of a midpoint of the overall length of the mobility walker 10. For example, the transverse handle 16 may be positioned about 6 inches, about 7 inches, or about 8 inches rearward of the midpoint of the overall length of the mobility walker 10. As such, embodiments of the present invention permits a center of gravity 20 of the mobility walker 10, as illustrated in FIG. 6, to be positioned forward of the transverse handle 16. As such, the mobility walker 10 may be configured to resist tipping when pushed from behind. Nevertheless, it should be understood that in certain alternative embodiments, the mobility walker 10 may have a configuration that provides for its center of gravity to be aligned with the transverse handle 16 or positioned rearward of the transverse handle 16.

The individual components (e.g., the front legs 12, rear legs 14, and transverse handle 16) of the mobility walker 10 will now be described in more detail. Such components may be made from various types of materials of sufficient strength and durability to allow the mobility walker 10 to be structurally sound and to provide support to a user when operating the mobility walker 10 (e.g., standing or walking). For example, in some specific embodiments, the front legs 12, the rear legs 14, and the transverse handle 16 may be made from steel tubing having an inner diameter of about 0.75 inches and an outer diameter of about 0.875 inches. However, in other embodiments, the components may comprise tube or conduit formed from aluminum, polymers, plastics, fiber-glass, carbon fiber, composites, or the like. In some embodiments, the components may be formed via an extrusion process or other known manufacturing processes.

Figure 2:
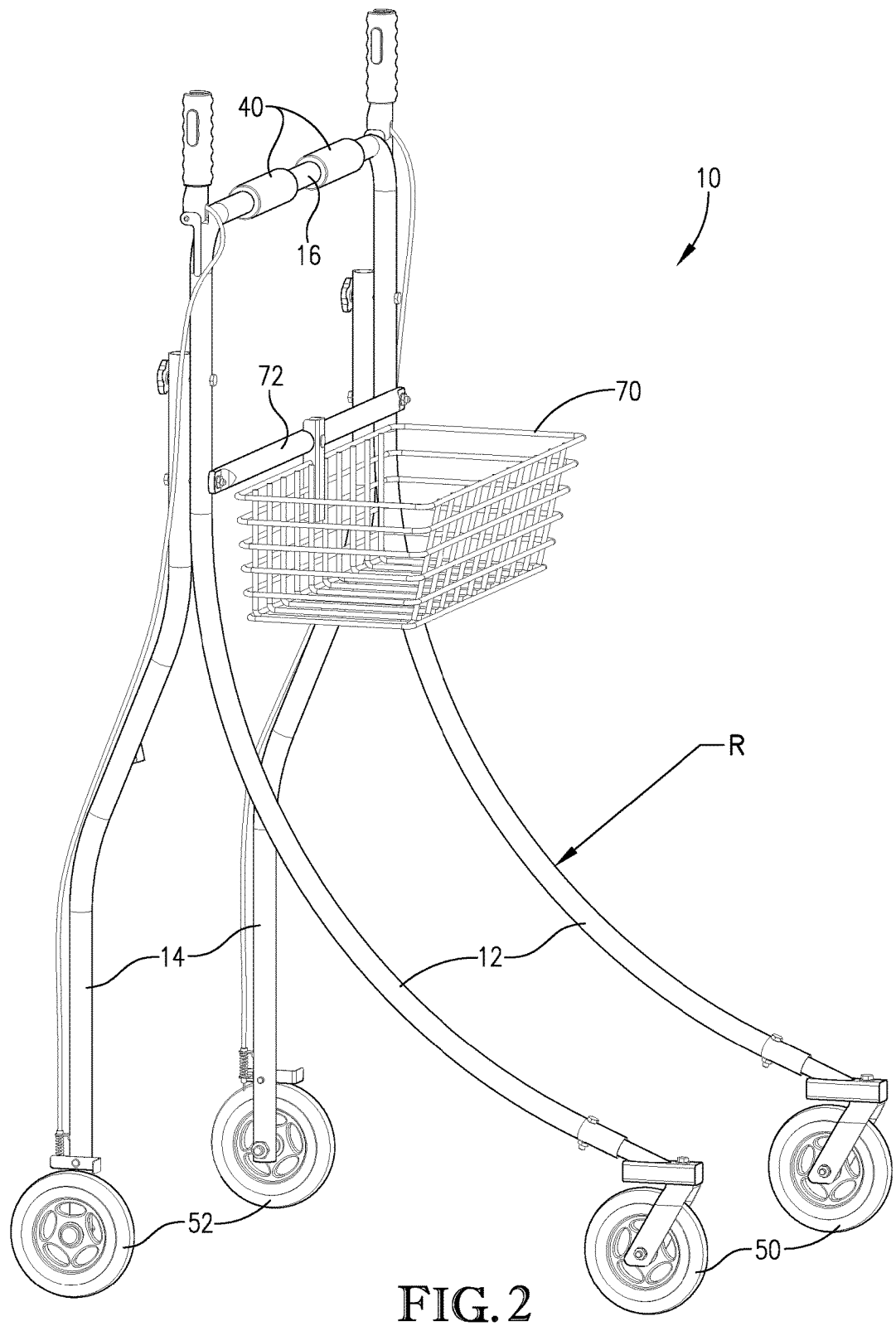
FIG. 2 is a right side perspective view of the mobility walker from FIG. 1.
Figure 3:
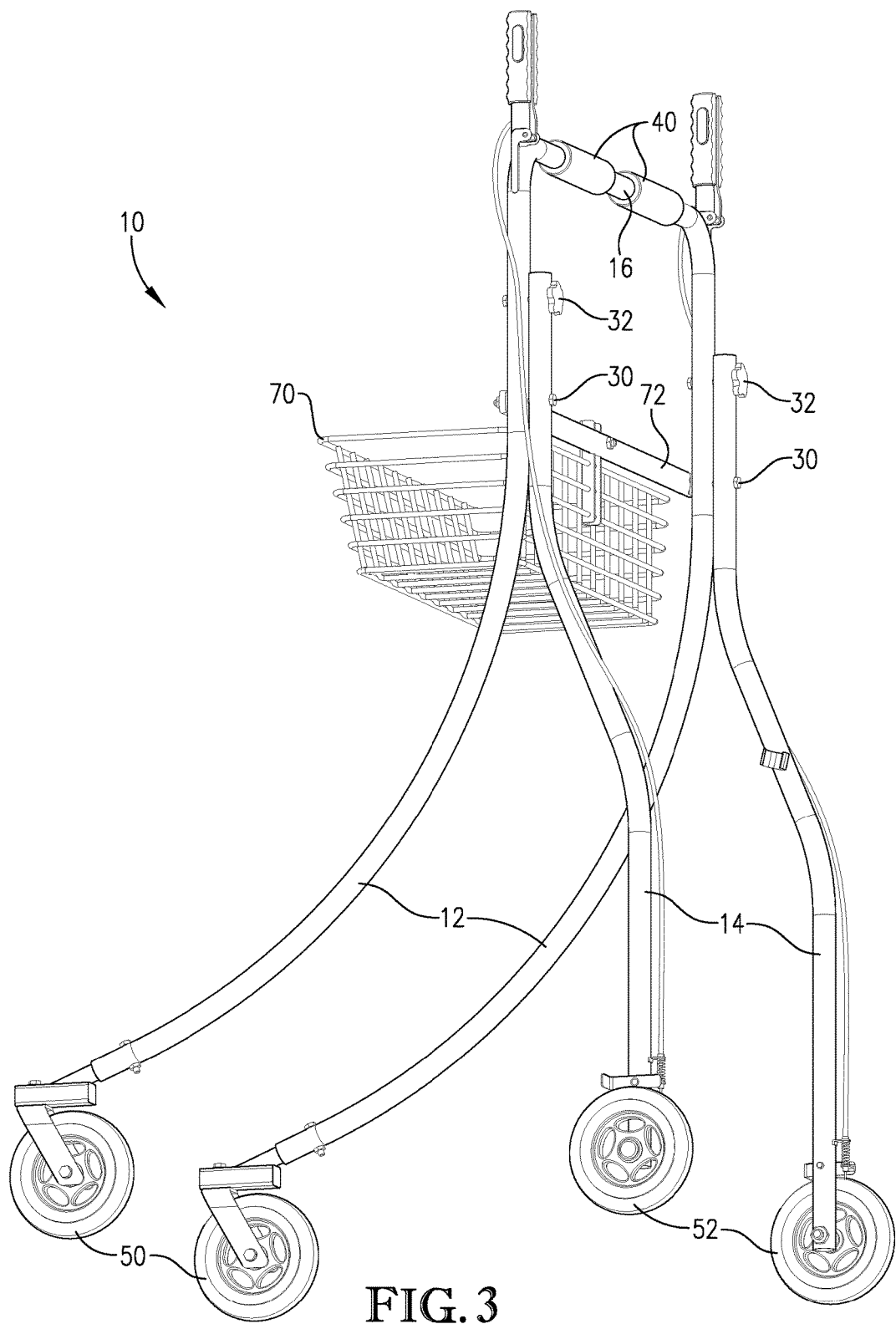
FIG. 3 is a rear left perspective view of the mobility walker from FIGS. 1-2.

Turning to the front legs 12 in more detail, as illustrated in FIGS. 2-3, each of the front legs 12 may include an upper portion that extend down from the transverse handle 16 to a main portion. In some embodiments, the upper portion may extend downward generally vertically between 14 and 8 inches, between 12 and 9 inches, or about 10 inches. The main portion of each of the front legs 12 may extend from the upper portion to the front end of the mobility walker 10 in a curvilinear fashion. In some embodiments, the main portion of each front leg 12 may extend between 16 and 35 inches, between 20 and 30 inches, or about 25 inches. As such, the main portion of each front leg 12 may extend at least 60 percent, at least 70, or at least 80 percent, or at least 90 percent of the overall curvilinear length of the front legs 12. In some embodiments, the main portions of each of the front legs 12 may extend to a front wheel assembly, which as described in more detail below, provides for front wheels to be secured to the front of the mobility walker 10.

The main portions of the front legs 12 may extend in the concave manner previously discussed. As such, in some embodiments, at least 60 percent, at least 70, or at least 80 percent, or at least 90 percent of the overall curvilinear length of the front legs 12 may be shaped in the concave manner. In some specific embodiments for example, as illustrated in FIG. 2, the main portions of the front legs 12 may have a radius of curvature R of between 15 and 40 inches, between 20 and 30 inches, between 22 and 28 inches, between 24 and 26 inches, or about 25 inches (as measured from a center of the steel tube of the front legs 12). Although the figures illustrate only the main portions of the front legs 12 as having the concave shape, in some embodiments, the entirety of the front legs 12 (i.e., 100 percent of the curvilinear length) may have a concave curvature (including the magnitudes noted above). In such embodiments, the upper portions of the front legs 12 may not extend exactly vertically. Instead, the upper portions might extend down from the transverse handle 16 in a somewhat rearward direction until the main portions of the front legs 12 begin to extend in the forward direction. In such embodiments (and in some other embodiments), the upper portion of the front legs 12 and the transverse handle 16 may slant at least slightly forward from the perspective of a user standing behind the mobility walker 10. Such a forward slanting of the upper portions of the front legs 12 (and transverse handle 16) may enhance stability of the mobility walker 10 by making the mobility walker 10 easier to push from behind and by preventing the mobility walker 10 from tipping when pressure is applied to the transverse handle 16 from behind. In certain embodiments, the overall forward/rearward extension of the front legs 12 may span about 60 percent, about 70 percent, about 75 percent of the entire length of the mobility walker 10. For example, in embodiments in which the mobility walker 10 may have an overall length of about 24 inches, while the front legs 12 may extend in an overall forward/rearward direction about 19 inches.

The rear legs 14 may extend downward from the front legs 12. In some embodiments, the rear legs 14 may extend down generally vertically from an upper portion of the front legs 12. However, in other embodiments, the rear legs 14 may have a segmented shape that permits the rear legs 14 to also extend in a partially rearward direction. For instance, as shown in FIGS. 2-3, each of the rear legs 14 may have an upper portion that is secured to a back side of the front legs 12 and extends down generally vertically. The rear legs 14 may each additionally include a central portion that extends from the upper portion in a downward and rearward direction to a bottom portion. The bottom portion of each rear leg 14 may extend down generally vertically to a rear wheel assembly, which as described in more detail below, rear wheels to be secured to the rear of the mobility walker 10. In certain embodiments, the forward/rearward extension of the rear legs 14 (due, for instance, to the forward/rearward extension of the central portion of the rear legs 14) may span about 40 percent, about 30 percent, or about 25 percent of the entire length of the mobility walker 10. For example, in embodiments in which the mobility walker has a length of about 24 inches, the rear legs 14 may extend forward/rearward about 5 inches. Although the above description (and the drawing illustrations) described the upper and bottom portions of the rear legs 14 as extending downward generally vertically, it should be understood that in some embodiments, the entirety of the rear legs 14 may extend at least partially in a forward/rearward direction. For example, in embodiments in which the entire front legs 12 are curved in a concave manner, the rear legs 14 may be connected to the front legs 12 in a manner that requires the entirety of the rear legs 14 to at least partially extend forward/rearward (e.g., in a forward-slanting manner) when extending downward from the front legs 12.

The rear legs 14 may be secured to the front legs 12 by various methods of attachment. For example, in some embodiments, the upper portions of the rear legs 14 may be rigidly secured to upper portions of the front legs 12 via welding. However, in some embodiments, it may be preferable for the mobility walker 10 to be at least partially collapsible, such that the mobility walker 10 can be configured with a small enough footprint so as to allow the mobility walker 10 to be efficiently transported and/or stored. For example, some embodiments may provide for the mobility walker 10 to be collapsed, such that the mobility walker 10 can carried, placed in the trunk of a car, placed in a home closet, or the like. To facilitate such collapsibility, as perhaps best illustrated in FIG. 3, each of the rear legs 14 may be secured to the front legs 12 via a releasable securement assembly. The releasable securement assembly may comprise a pivot fastener 30 and a releasable fastener 32. The pivot fastener 30 may be configured as a pin or bolt that extends through aligned openings in the front and rear legs 12, 14. The pivot fastener 30 may include a nut or other similar mechanism to secure the pin or bolt within the aligned openings. However, embodiments provide for the pivot fastener to not overly tighten the front legs 12 and the rear legs 14 together. Instead, the pivot fastener 30 may be configured to act as a pivot axis about which the rear leg 14 may rotate with respect to the font leg 12. Contrastingly, the releasable fastener 32 of each releasable securement assembly may be configured as a pin or bolt that extends through aligned openings in the front and rear legs 12, 14 and that rigidly secures the rear legs 14 to the front legs 12. The releasable fastener 32 may include a nut or other similar mechanism to secure the pin or bolt within the aligned openings. Such nut may be removed from the pin or bolt so as to permit the releasable fastener 32 to be removed from the openings of the front and rear legs 12, 14 such that the rear legs 14 are free to rotate about the pivot axes of the pivot fastener 30. In some specific embodiments the releasable fastener 32 may be configured as a spring-loaded knob, which permits the user to quickly hand-loosen the releasable fastener 32 so as to allow the rear legs 14 to rotate about the pivot axes to a collapsed position. Such a spring-loaded knob also permits the user to quickly re-tighten the releasable fastener 32 so as to re-secure the rear legs 14 to the front legs 12 when transitioning the mobility walker 10 from a collapsed configuration to an operational configuration.

Figure 4:
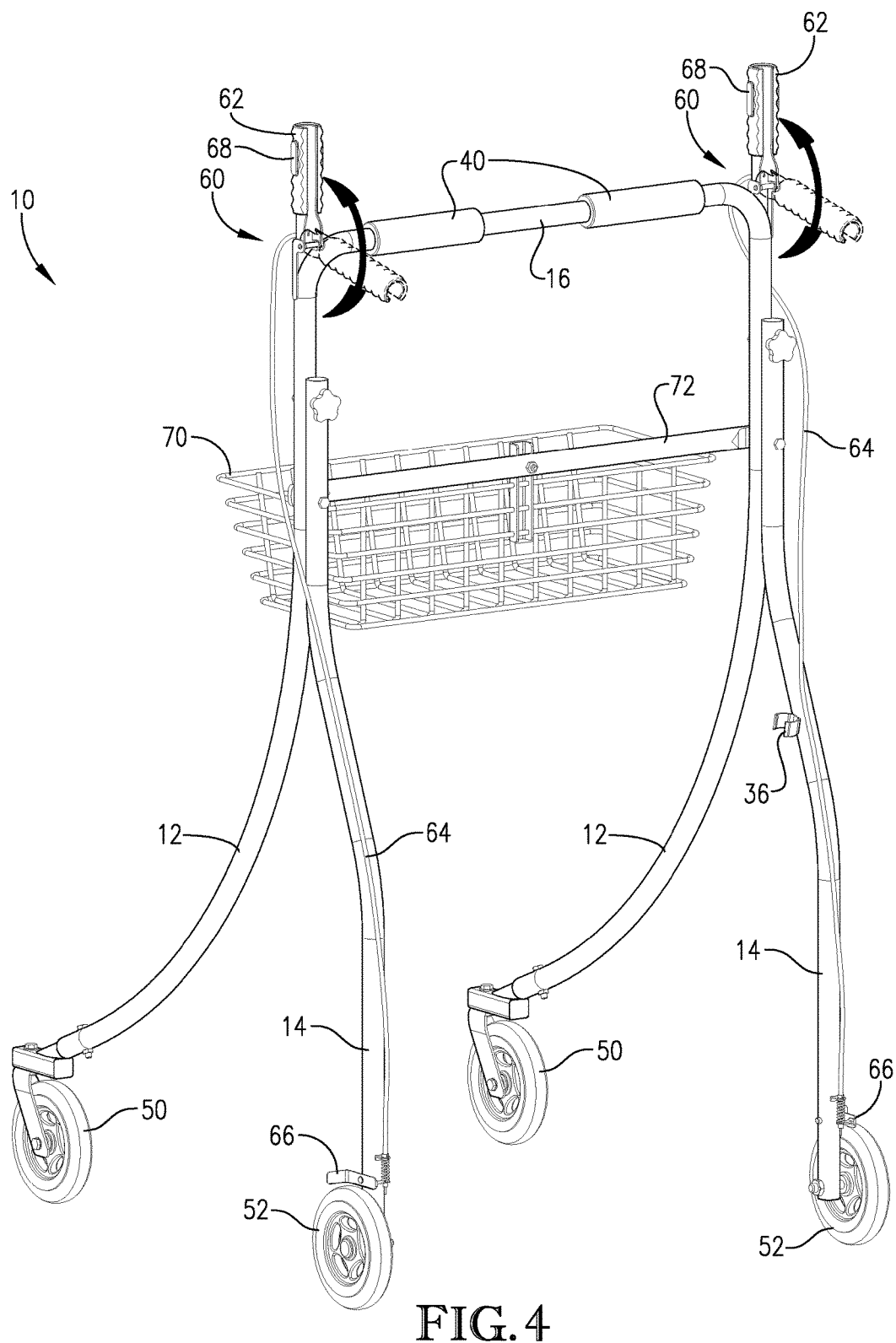
FIG. 4 is another rear left perspective view of the mobility walker from FIGS. 1-3, particularly illustrating a direction of actuation of brake levers of the mobility walker.
Figure 7:
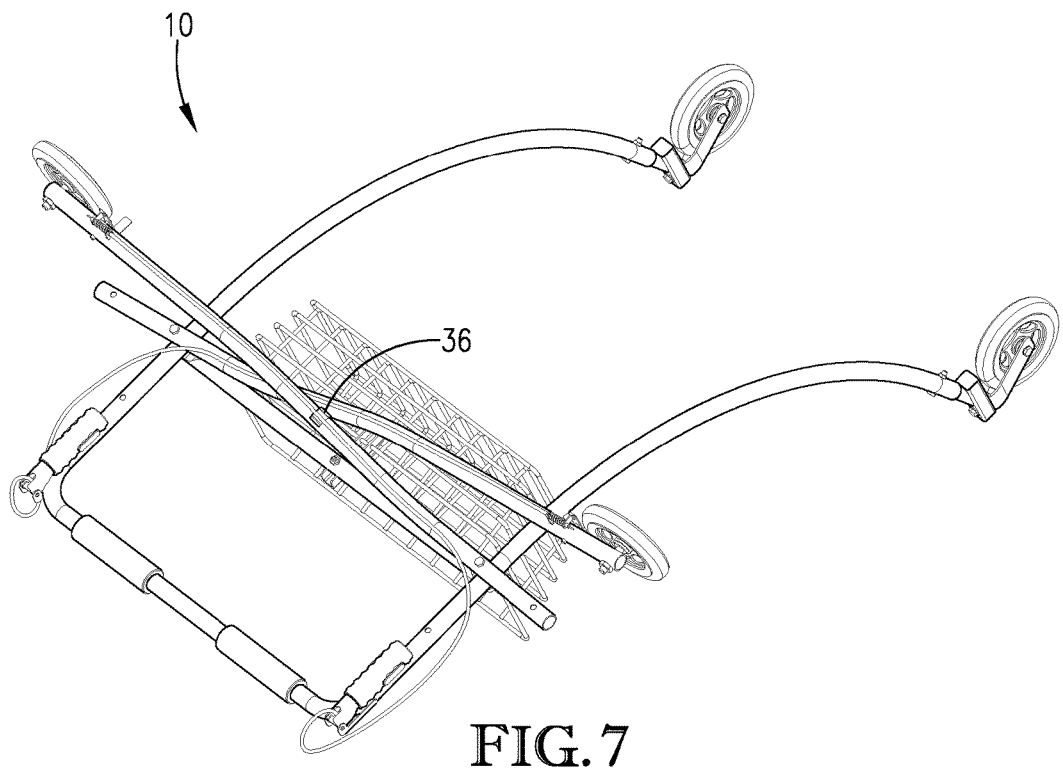
FIG. 7 is a rear side perspective view of the mobility walker from FIGS. 1-6 in a collapsed configuration.
Figure 8:
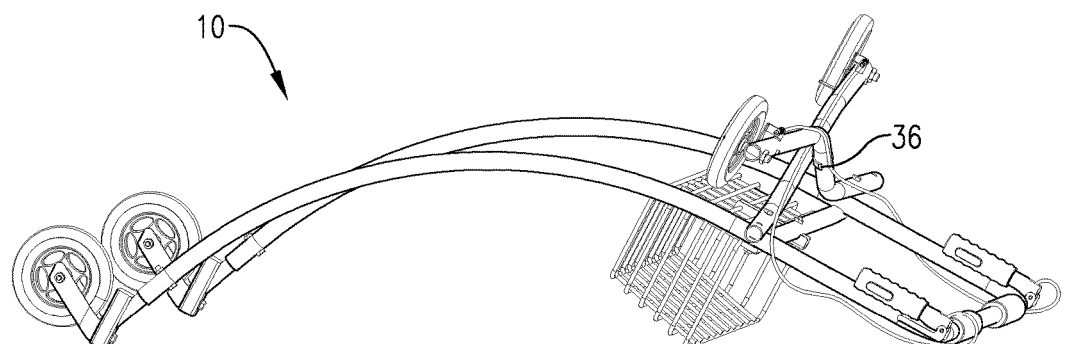
FIG. 8 is side perspective view of the mobility walker from FIG. 7 in the collapsed configuration.

FIGS. 7 and 8 illustrate the mobility walker 10 in the collapsed configuration. As noted above, to position the mobility walker 10 in the collapsed configuration, the releasable fasteners 32 can be released or loosened, such that the rear legs 14 can be rotated about the pivot axes of the pivot fasteners 30. Specifically, the rear legs 14 can be pivoted, with bottom end of the rear legs 14 being rotated inward, until the rear legs 14 cross each other to form an X-shape, as is shown in FIGS. 7 and 8. The rear legs 14 may be retained in such an X-shape via a securement mechanism, such as a clip 36. As shown in FIG. 4, the clip 36 may be positioned on one of the rear legs 14. As such, when the rear legs 14 are rotated inward to form the X-shape, the other rear leg 14 can be securely retained within the clip 36 in a snap-fit fashion. With the rear legs 14 held together in the X-shape via the clip 36, the mobility walker 10 will be positioned in the collapsed configuration such that the mobility walker 10 can be easily carried or stored for transport. To transition the mobility walker 10 from the collapsed configuration (e.g., FIGS. 7 and 8) to the operational configuration (e.g., FIGS. 1-5), the rear leg 14 retained within the clip 36 can be removed from the clip such that the rear legs 14 are free to rotate outward (about the pivot fasteners 30) until aligned with the front legs 12 in the operational configuration. The releasable fasteners 32 can then secure the rear legs 14 to the front legs 12 to secure the mobility walker 10 in the operation configuration.

Turning now to the transverse handle 16, as described above, the transverse 16 may extend between the upper portions of the front legs 12. As such, in some embodiments, the transverse handle 16 may extend across the entire width of the mobility walker 10, such that the transverse handle 16 may have a length of between 15 and 35 inches, between 20 and 30 inches, or about 22 inches. With a user positioned rearward of the mobility walker 10, the user can grasp the transverse handle 16 to operate the mobility walker 10, as is illustrated in FIG. 1, by reaching out the user's hands in front of their body. To facilitate the user's grip on the transverse handle 16, some embodiments provide for the transverse handle 16 to include one or more handgrips 40, as shown in FIGS. 2-5, wrapped around portions of the transverse handles 16. The handgrips 40 may be formed from foam, rubber, leather, or other material configured to enhance a user's grip on the transverse handle 16. As shown in the drawings, certain embodiments provide for the transverse handle 16 to include two handgrips 40, positioned on either side of the transverse handle 16 so that the user can grasp a handgrip 40 with each hand.

Remaining with FIGS. 1-5, embodiments of the present invention may also provide for the mobility walker 10 to include wheels on bottom ends of each of its legs 12, 14 so as to facilitate mobility of the mobility walker 10. Specifically, the mobility walker 10 may include front wheels 50 positioned on the bottom of the front legs 12, and rear wheels 52 positioned on the bottoms of the rear legs 14. Such wheels 50, 52 may come in various sizes and may be made from various materials so as to facilitate mobility over various types of ground surfaces, such as paved ground, grass, gravel, carpet, and the like. In some embodiments, the wheels may have a diameter of between 2 and 10 inches, between 3 and 9 inches, between 4 and 8 inches, or about 5 inches. Tire portions of the wheels may be formed from plastic, rubber, or other similar material configured to provide sufficient traction for indoor/outdoor use, while providing durability of the wheels. In some embodiments, the rear wheels 52 (positioned on bottoms of the rear legs 14) may be unidirectional, such that they are continuously directed in a forward/rearward direction and are generally restricted from rotating. Contrastingly, to facilitate turning of the mobility walker 10, the front wheels 50 (positioned on bottoms the front legs 12) may be rotatingly secured to the front legs 12, such that the front wheels 50 are free to swivel or rotate. For instance, the front wheels 50 may be caster-type wheels that are free to swivel or rotate 360 degrees. The wheels 50, 52 may be connected to the legs 12, 14 via various methods of attachment. For example, as shown in the drawings, the front wheels 50 may be secured to the front legs 12 via wheel attachment brackets (such as which permit the front wheels 50 to rotate), while the rear wheels 52 may be directly secure to the rear legs 14.

In some embodiments, the mobility walker 10 may include a brake system for preventing the mobility walker 10 from movement (inadvertent movement or otherwise). In more detail, and with reference to FIGS. 4-5, a brake system 60 is illustrated, which includes components that restrict one or more of the wheels 50, 52 of the mobility walker 10 from rotating. In some embodiments, the brake system 60 may restrict only on the rear wheels 52 from rotating. Broadly, the brake system 60 may comprise one or more brake levers 62, associated Bowden cables 64, and brake mechanisms 66. In some embodiments, the brake levers 62 may comprise a pair of hand levers that are each rotatingly connected to the transverse handle 16 and/or to upper portions of the front legs 12, as shown in the drawings. The brake mechanism 66 may comprise an actuating wheel lock for selectively engaging the tire portion of the rear wheels 52 (i.e., locking the wheels). The Bowden cables 64 connect the brake mechanisms 66 with the brake levers 62 so as to allow a user to actuate the brake mechanisms 66 by actuating the brake levers 62.

In more detail, the brake levers 62 may normally be positioned in an unlocked position, as shown in solid line FIG. 4, in which the brake levers 62 are rotated upward, extending away from the transverse handle 16 in a generally orthogonal manner. In such an unlocked position, the brake mechanisms 66 are not engaged with the rear wheels 52, such that the mobility walker 10 can be freely moved. In some embodiments, however, the brake levers 62 may include one or more integral brake buttons 68 or levers, which when actuated engages the brake mechanisms 66 against the rear wheels 52 to slow the speed of the mobility walker 10 and/or to restrict movement of the mobility walker 10. Nevertheless, when in the unlocked position (e.g., FIG. 4), the brake levers 62 may also be used as secondary handgrips. Such secondary handgrips may enhance the ability of the user to grasp and hold-on to the mobility walker 10. The secondary handgrips may also enhance the user's control over the mobility walker 10, particularly when performing turning maneuvers. In some embodiments, the brake levers 62 may be configured in the unlocked position while extending generally horizontally away from the back side of the mobility walker 10 (as shown in dashed line in FIG. 4). Specifically, the brake levers 62 may extend rearward from the transverse handle 16 and/or to upper portions of the front legs 12 in a generally horizontal manner. In such a position, the brake levers 62 may be used as secondary handgrips to facilitate the user's grip on the mobility walker and/or to enhance the user's control over the mobility walker 10

Figure 5:
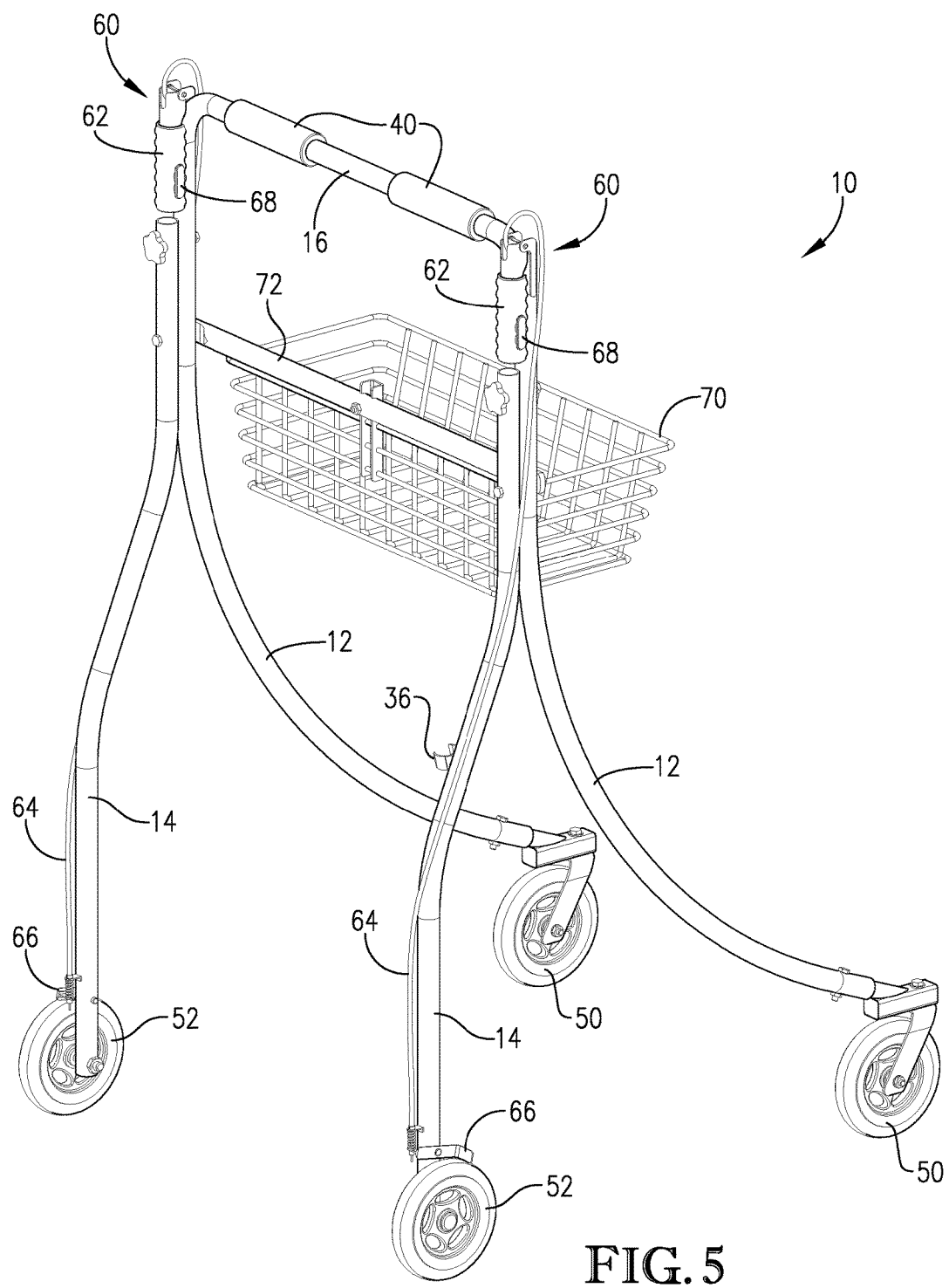
FIG. 5 is a rear right perspective view of the mobility walker from FIGS. 1-4, particularly illustrating the brake levers down in a locked position.

To restrict movement of the mobility walker 10, the brake levers 62 can be actuated to a locked position, as shown in FIG. 5. In the locked position, the brake levers 62 may be rotated downward until they are positioned adjacent to back side of the front legs 12 and/or generally orthogonal with the transverse handle 16. In such a locked position, the brake levers 62 actuate the brake mechanisms 66, via the Bowden cables 64, into engagement with the rear wheels 52, such that the rear wheels 52 are locked in place and restricted from rotating. As such, with the brake levers 62 in the locked position, the mobility walker 10 will have its movement restricted.

Figure 9:
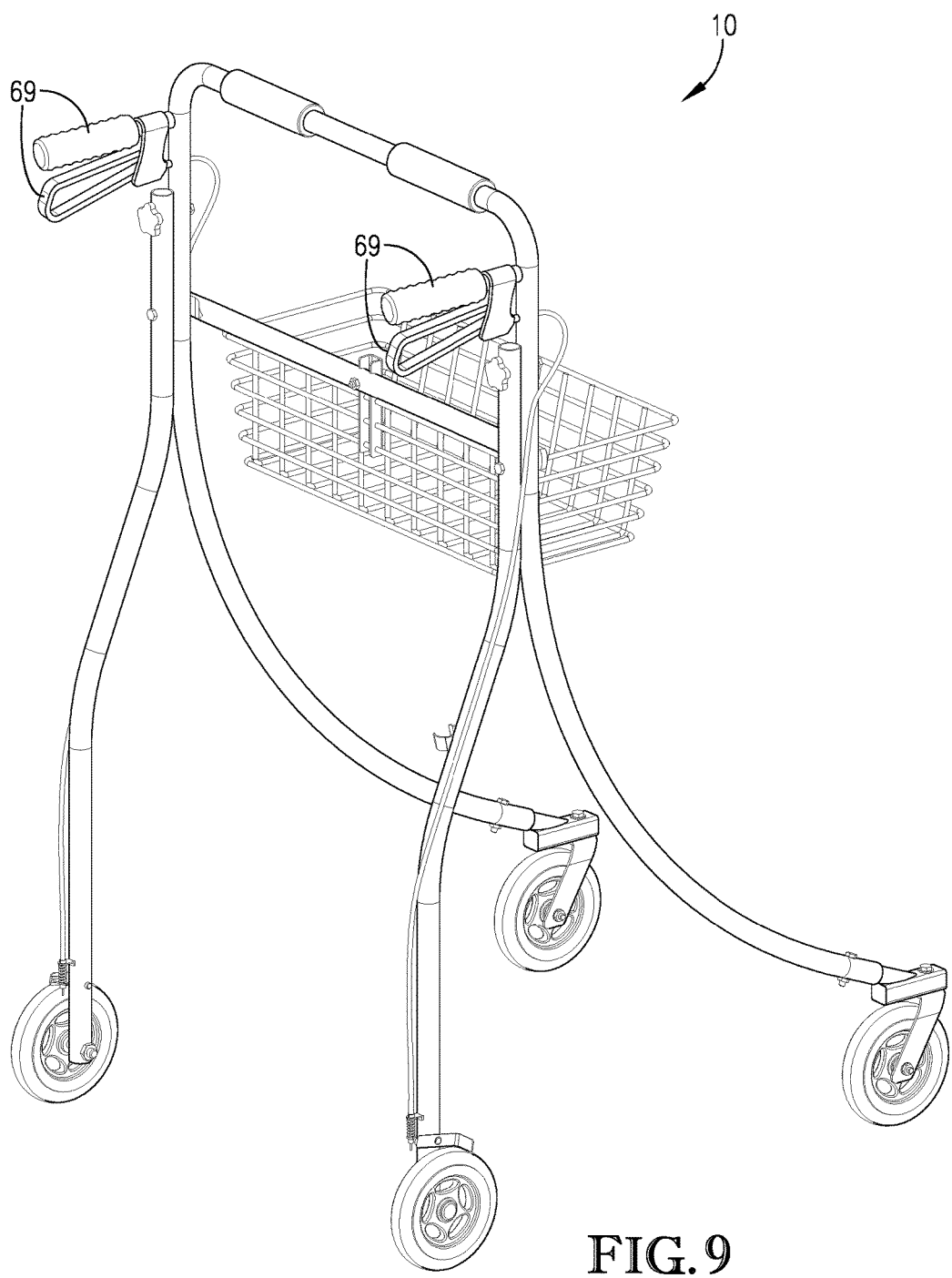
FIG. 9 is a rear perspective view of another mobility walker according to embodiments of the present invention, illustrating a brake system that includes handle-squeeze locks extending from a back side of the mobility walker.

FIG. 9 illustrates another embodiment of a brake system that can be incorporated with the mobility walker 10 of the present invention. In place of the brake levers 62, the brake system illustrated in FIG. 9 may include a pair of handle-squeeze locks 69 that extend from the back side of the mobility walker (e.g., from the front legs 12 and/or from the rear legs 14). Such handle-squeeze locks 69 may function as gripping mechanisms for the mobility walker 10, as well as actuators for the brake mechanisms 66. Specifically, when the handle-squeeze locks 69 are squeezed by a user, the brake mechanisms 66 may be engaged with the rear wheels 52 of the mobility walker 10 to restrict movement of the mobility walker 10.

In addition to the features described above, certain embodiments of the mobility walker 10 may include other features that enhance operability and functionality of the mobility walker 10. For instance, some embodiments of the mobility walker may include a basket 70, as shown in FIG. 1-5, which is secured to a front side of the mobility walker 10. Such a basket 70 may be used to support a user's personal items (e.g., clothing, purses, medical devices, medication, etc.) as the user is using the mobility walker 10. In some embodiments, the basket 70 may be secured to the mobility walker 10 via one or more cross-members 72 extending between the legs 12, 14 of the mobility walker 10. For example, as shown in FIGS. 2-5, the cross-member 72 may extend between the front legs 12 at a position below and parallel with the transverse handle 16. Such cross-member 72 may, in addition to securing the basket 70 to the mobility walker 10, be used to increase the strength and stability of the mobility walker 10.

Finally, in other embodiments, the mobility walker 10 may include an integral seat (not shown) positioned between the legs of the mobility walker 10. In some embodiments, the seat may be rotatably attached to the mobility walker 10 so as to be transitionable from a deployed position, in which a user can sit on the seat, to a retracted position, in which the seat is stowed and out of the user's way. It should be understood that in embodiments that include the basket 70 and/or the seat, these components may be positioned so as to not interfere with a user's legs and feet when operating the mobility walker 10 (i.e., so as to allow the user to maintain a normal gait while walking with the mobility walker 10).

The above-described mobility walker 10 of the present invention can be used by a user for support while standing or walking. In use, the user can simply reach their hands out in front of their body and grasp the transverse handle 16 (and/or the primary handgrips 40), as illustrated in FIG. 1. Because of the inherent stability of the mobility walker 10, the mobility walker 10 provides a stable platform for supporting the user when standing. In some instances, it may be beneficial for the brake system 60 to be positioned in the locked position (i.e., FIG. 5) when the user is standing, so as to prevent any inadvertent movement of the mobility walker 10.

In addition, the mobility walker 10 can provide a stable platform to support a user transitioning from a seated position to a standing position. Specifically, the user can place one hand on the cross-member 72 and can push off from the user's seat with his/her other hand, so as to rise from a seated position to a standing position. Such a transition can be difficult with previously-used hands at the side walker designs, as such previously-used walkers require that both of the user's hands be simultaneously positioned on the individual handles of the previously-used walkers to ensure stability of the walkers.

With embodiments of the present invention, once the user is in the standing position and wishes to advance the mobility walker 10, the user can simply walk forward (or rearward) in a normal manner. With the user's hands continuing to grasp the transverse handle 16, the user simply pushes the mobility walker 10 (similar to operating a shopping cart), and the mobility walker 10 will advance along with the user. As such, the mobility walker 10 continues to provide support and stability to the user as the user walks. To turn the mobility walker 10, the user can simply direct the walker by applying the appropriate directional pressure on the transverse handle 16 or use the brake levers 62 when the brake system is in the unlocked position. Because the front wheels 50 are permitted to freely rotate, the mobility walker 10 can be efficiently turned in any required direction. Furthermore, as noted above, certain embodiments of the present invention permit the brake levers 62 to function as secondary handgrips when in the unlocked position. As such, the user can also grasp the secondary handgrips for support and for turning the mobility walker 10.

Beneficially, because the user is supported by the mobility walker 10 by grasping the transverse handle 16 (and/or the primary handgrips 40), the user can maintain an upright, erect posture during use of the mobility walker 10. Such benefits are not provided with previously-used hands at the side walker designs, which require users to press down on the side handles and then push ahead with their arms lowered to their sides. As noted previously, pushing a walker forward with the user's hands at his/her side necessitates forward leaning and bending of the user's back, neck, and shoulders. In addition, the transverse handle 16 of the present invention allows the user to operate the mobility walker 10 without fear of injuring the user's hands as he/she walks through doorways because the user's hands are always positioned on the transverse handle 16 (and/or the primary handgrips 40), well inside of the doorway. Such benefits are not provided by previously-used hands at the side walker designs.

In addition to the above, the design of the mobility walker 10 of the present invention promotes a normal gait. Specifically, a user of the mobility walker of the present invention can walk with a normal walking style (i.e., one foot after another). Specifically, the user can simply walk in a normal fashion while holding on to the transverse handle 16 (and/or the primary handgrips 40) for support. This is not possible with previously-used hands at the side walker designs, which tend to force users to extend a first foot, bring the second foot up to meet the first foot, and then extend the first foot again. Finally, because the legs 12, 14 of the mobility walker 10 are positioned sufficiently far apart (across the width of the mobility walker 10), a user can walk with a normal gait, free from interference from components of the mobility walker 10. This is not possible with many previously-used walkers, in which integral seats or other structural components interfere with a user's legs and feet when walking. Such a width of the mobility walker 10 also provides for the mobility walker 10 to accommodate users of various girths without necessitating adjustability of the mobility walker.

Although the invention has been described with reference to the preferred embodiment illustrated in the attached drawing figures, it is noted that equivalents may be employed and substitutions made herein without departing from the scope of the invention as recited in the claims.

What is claimed is:

1. A mobility walker comprising:
   a pair of rear legs and a pair of front legs, each configured to support said mobility walker on the ground;
   a transverse handle extending laterally across a width of said mobility walker, wherein said transverse handle comprises a primary handgrip configured to be grasped by a user when operating said mobility walker,
   wherein at least sixty percent of the length of each of said front legs is formed with a concave curvature, as viewed from a front of said mobility walker; and
   a pair of brake levers pivotally secured to said transverse handle or to said front legs,
   wherein said brake levers are configured to be selectively positioned in a locked position such that movement of said mobility walker is restricted and in an unlocked position such that movement of said mobility walker is not restricted,
   wherein when said brake levers are in the locked position said brake levers extend downward, parallel and adjacent to said front legs, wherein when said brake levers are in the unlocked position said brake levers extend away from said front legs, and upward from and orthogonal to said transverse handle, such that said brake levers are configured to act as secondary handgrips for the user to control said mobility walker.

2. The mobility walker of claim 1, wherein the concave curvature of each of said front legs has a radius of curvature between 20 and 30 inches.

3. The mobility walker of claim 1, wherein a center of gravity of said mobility walker is positioned forward of said transverse handle.

4. The mobility walker of claim 1, wherein said transverse handle extends between upper ends of said front legs.

5. The mobility walker of claim 4, wherein said transverse handle is integrally formed with said front legs.

6. The mobility walker of claim 1, wherein said primary handgrip extends around at least a portion of said transverse handle.

7. The mobility walker of claim 1, wherein said rear legs are connected with said front legs, wherein said rear legs extend rearward from said front legs, and wherein said front legs extend forward from said rear legs.

8. The mobility walker of claim 7, wherein said rear legs are pivotally connected to said front legs such that said rear legs are configured to collapse together to position said mobility walker in a collapsed configuration.

9. The mobility walker of claim 8, wherein said mobility walker comprises a clip for securing said rear legs together to maintain said mobility walker in the collapsed configuration.

10. The mobility walker of claim 1, wherein said mobility walker comprises a front wheel secured to a bottom end of each front leg, and wherein said mobility walker comprises a rear wheel secured to a bottom end of each rear leg.

11. The mobility walker of claim 10, wherein said rear wheels are unidirectional, and wherein said front wheels are free to rotate with respect to said front legs.

12. The mobility walker of claim 10, wherein said mobility walker comprises a brake system for locking one or more of said wheels, so as to restrict movement of said mobility walker.

13. The mobility walker of claim 12, wherein said brake system comprises the pair of brake levers and a brake mechanism, wherein actuation of said brake levers locks at least one of said wheels by engaging the brake mechanism with said wheel.

14. The mobility walker of claim 13, wherein said brake levers each include an integral brake button configured to be selectively actuated to slow the speed of the mobility walker by engaging the brake mechanism against said wheel.

15. The mobility walker of claim 1, wherein said mobility walker is formed with a length of between 20 and 40 inches, a width of between 15 and 35 inches, and a height of between 35 and 55 inches.

16. A mobility walker comprising:
a pair of rear legs and a pair of front legs, each configured to support said mobility walker on the ground;
a transverse handle extending laterally across a width of said mobility walker, wherein said transverse handle comprises a primary handgrip configured to be grasped by a user when operating said mobility walker,
wherein at least a portion of said front legs is formed with a concave curvature, as viewed from a front of said mobility walker,
wherein a center of gravity of said mobility walker is positioned forward of said transverse handle; and
a pair of brake levers pivotally secured to said transverse handle or to said front legs,
wherein said brake levers are configured to be selectively positioned in a locked position such that movement of said mobility walker is restricted and in an unlocked position such that movement of said mobility walker is not restricted,
wherein when said brake levers are in the locked position said brake levers extend downward, parallel and adjacent to said front legs,
wherein when said brake levers are in the unlocked position said brake levers extend away from said front legs, and away from and orthogonal to said transverse handle, such that said brake levers are configured to act as secondary handgrips for the user to control said mobility walker.

17. The mobility walker of claim 16, wherein the concave curvature of each of said front legs has a radius of curvature between 20 and 30 inches.

18. The mobility walker of claim 16, wherein at least 60 percent of the length of each front leg is formed with the concave curvature.

19. The mobility walker of claim 16, wherein said front legs and said rear legs comprise steel tubing.

20. The mobility walker of claim 16, wherein said brake levers each include an integral brake button configured to be selectively actuated to slow the speed of the mobility walker.

21. A method of operating a mobility walker by a user, said method comprising the steps of:
(a) providing the mobility walker that comprises a frame that includes a pair of front legs, a pair of rear legs, a transverse handle, and a pair of brake levers pivotally secured to said transverse handle or to said front legs, wherein the transverse handle extends generally across a width of the mobility walker, and wherein at least a portion of each of the front legs is formed with a concave curvature, as viewed from a front of the mobility walker;
(b) grasping the transverse handle with the user's hands extended in front of the user's body;
(c) advancing the mobility walker in a forward direction by walking forward with the user's hands grasping the transverse handle;
(d) shifting the brake levers to a locked position such that movement of the mobility walker is restricted, wherein when the brake levers are in the locked position the brake levers extend downward, parallel and adjacent to the front legs; and
(e) shifting the brake levers to an unlocked position such that that movement of the mobility walker is not restricted, wherein when the brake levers are in the unlocked position the brake levers extend away from the front legs, and upward and orthogonal to the transverse handle, such that the brake levers are configured to act as secondary handgrips for the user to control the mobility walker; and
(f) grasping the brake levers with the user's hands to control the mobility walker.

\* \* \* \* \*